US012002323B2

(12) United States Patent
Casey

(10) Patent No.: US 12,002,323 B2
(45) **Date of Patent: *Jun. 4, 2024**

(54) SYSTEMS AND METHODS FOR MODIFYING ONE OR MORE SYMBOLS ON ONE OR MORE STILL-SPINNING REELS OF A WAGERING GAME

(71) Applicant: Aristocrat Technologies Australia Pty Limited, North Ryde (AU)

(72) Inventor: Michael P. Casey, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,226

(22) Filed: Apr. 21, 2023

(65) Prior Publication Data

US 2023/0260359 A1 Aug. 17, 2023

Related U.S. Application Data

(63) Continuation of application No. 17/748,822, filed on May 19, 2022, now Pat. No. 11,663,879, which is a continuation of application No. 17/061,183, filed on Oct. 1, 2020, now Pat. No. 11,468,730, which is a continuation of application No. 16/122,548, filed on Sep. 5, 2018, now Pat. No. 10,810,829.

(51) Int. Cl.
*G07F 17/32* (2006.01)

(52) U.S. Cl.
CPC ...... *G07F 17/3213* (2013.01); *G07F 17/3209* (2013.01); *G07F 17/3267* (2013.01); *G07F 17/3269* (2013.01)

(58) Field of Classification Search
CPC ............ G07F 17/3213; G07F 17/3209; G07F 17/3269; G07F 17/3267
See application file for complete search history.

(56) References Cited

U.S. PATENT DOCUMENTS 7,014,559 B1 3/2006 Fong
7,601,060 B2 10/2009 Baerlocher
7,677,971 B2 3/2010 Baerlocher
(Continued)

FOREIGN PATENT DOCUMENTS

AU 2011205196 B2 8/2014

OTHER PUBLICATIONS

Office Action (Final Rejection) dated Dec. 20, 2023 for U.S. Appl. No. 18/171,634 (pp. 1-13).
(Continued)

*Primary Examiner* — Thomas H Henry
(74) *Attorney, Agent, or Firm* — Armstrong Teasdale LLP

(57) ABSTRACT

An electronic gaming machine performs operations comprising: (i) simulating a rotating plurality of reels; (ii) stopping a first reel of the simulated rotating plurality of reels; (iii) determining whether of a first plurality of symbols displayed include i) all standard symbols, or ii) at least one bonus trigger symbol; (iv) on at least one remaining reel of the simulated rotating reels one of: i) modifying at least one bonus trigger symbol with a standard symbol if all standard symbols are displayed, or ii) modifying the at least one standard symbol with at least one bonus trigger symbol; (v) stopping the remaining reels; (vi) evaluating the symbols stopped and displayed; and (vii) determining whether to provide a game award.

20 Claims, 7 Drawing Sheets

(56) References Cited

U.S. PATENT DOCUMENTS

| | | | |
|---|---|---|---|
| 8,348,754 | B2 | 1/2013 | Jackson |
| 8,360,851 | B2 | 1/2013 | Aoki |
| 8,388,435 | B2 | 3/2013 | Anderson |
| 9,171,423 | B2 | 10/2015 | O'Halloran |
| 10,796,521 | B2 | 10/2020 | Bolling, Jr. |
| 11,600,133 | B2 | 3/2023 | Bolling, Jr. |
| 2007/0105611 | A1 | 5/2007 | O'Halloran |
| 2007/0178959 | A1 | 8/2007 | Halprin |
| 2009/0054129 | A1 | 2/2009 | Yoshimura |
| 2009/0131150 | A1 | 5/2009 | Iverson |
| 2009/0286592 | A1 | 11/2009 | Vann |
| 2010/0190543 | A1 | 7/2010 | Englman |
| 2011/0098100 | A1 | 4/2011 | Tsombanidis |
| 2012/0034967 | A1 | 2/2012 | Owen |
| 2012/0172106 | A1 | 7/2012 | Caputo |
| 2012/0295689 | A1 | 11/2012 | Owen |
| 2013/0079101 | A1 | 3/2013 | Nicely |
| 2014/0221080 | A1 | 8/2014 | Cohen |
| 2014/0357342 | A1 | 12/2014 | Elias |
| 2015/0356813 | A1 | 12/2015 | Mead |
| 2016/0133087 | A1 | 5/2016 | Cong |
| 2017/0316641 | A1 | 11/2017 | Wortmann |
| 2018/0053379 | A1 | 2/2018 | Meyer |
| 2019/0026976 | A1 | 1/2019 | Casey |
| 2019/0026977 | A1 | 1/2019 | Bolling, Jr. |
| 2021/0019985 | A1 | 1/2021 | Bolling, Jr. |
| 2023/0206718 | A1 | 6/2023 | Bolling, Jr. |

OTHER PUBLICATIONS

Office Action (Notice of Allowance and Fees Due (PTOL-85)) dated Feb. 27, 2024 for U.S. Appl. No. 18/171,634 (pp. 1-8).

Australian Examination Report No. 1 issued in App. No. AU2021225256, dated Nov. 17, 2022, 3 pages.

Australian Examination Report No. 1 for App. No. AU2019275667, dated Sep. 4, 2020, 3 pages.

Office Action (Non-Final Rejection) dated Nov. 12, 2021 for U.S. Appl. No. 17/061,198 (pp. 1-16).

Office Action (Non-Final Rejection) dated Jan. 21, 2022 for U.S. Appl. No. 17/061,183 (pp. 1-5).

Office Action (Notice of Allowance and Fees Due (PTOL-85)) dated Mar. 31, 2022 for U.S. Appl. No. 17/061,183 (pp. 1-7).

Office Action (Final Rejection) dated May 12, 2022 for U.S. Appl. No. 17/061,198 (pp. 1-16).

Office Action (Non-Final Rejection) dated Sep. 2, 2022 for U.S. Appl. No. 17/061,198 (pp. 1-10).

Office Action (Notice of Allowance and Fees Due (PTOL-85)) dated Dec. 9, 2022 for U.S. Appl. No. 17/061,198 (pp. 1-8).

Office Action (Notice of Allowance and Fees Due (PTOL-85)) dated Jan. 30, 2023 for U.S. Appl. No. 17/748,822 (pp. 1-12).

Notice of Allowance dated Jun. 24, 2020 for U.S. Appl. No. 15/925,382 (pp. 1-10).

Notice of Allowance dated Jul. 14, 2020 for U.S. Appl. No. 16/122,548 (pp. 1-12).

Office Action (Non-Final Rejection) dated Aug. 17, 2023 for U.S. Appl. No. 18/171,634 (pp. 1-17).

SYSTEMS AND METHODS FOR MODIFYING ONE OR MORE SYMBOLS ON ONE OR MORE STILL-SPINNING REELS OF A WAGERING GAME

CROSS-REFERENCE TO RELATED APPLICATIONS

This application is a continuation of and claims priority to U.S. patent application Ser. No. 17/748,822, filed May 19, 2022, which is a continuation of U.S. patent application Ser. No. 17/061,183, now U.S. Pat. No. 11,468,730, filed Oct. 1, 2020, which is a continuation of U.S. patent application Ser. No. 16/122,548, now U.S. Pat. No. 10,810,829, filed Sep. 5, 2018, each of which are incorporated herein by reference in their entireties.

TECHNICAL FIELD

The field of disclosure relates generally to electronic gaming, and more particularly to systems and methods for modifying one or more symbols on one or more still-spinning simulated rotating reels of a wagering game.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to “cash out.”

Slot games are often displayed to the player in the form of various symbols arranged in a row-by-column grid, or “matrix.” Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a “pay-table” that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

The symbols displayed by many EGMs may vary. For example, many gaming machines may display one or more bonus trigger symbols, such as one or more jackpot symbols, in the row-by-column matrix of symbols. If a bonus trigger condition is achieved, such as a predefined combination of bonus trigger symbols, a bonus award may be provided to the player. However, in some cases, one or more bonus trigger symbols may be displayed in a combination or pattern that does not satisfy the bonus trigger condition. When this occurs, the displayed one or more bonus trigger symbols may block or interrupt a pattern of non-bonus trigger symbols (e.g., a pattern of standard symbols) which might, in the absence of the “blocking” symbol or symbols, result in a standard line win.

Accordingly, systems and methods for modifying one or more symbols on one or more still-spinning simulated rotating reels of a wagering game are desirable. More particularly, systems and methods for replacing one or more bonus trigger symbols of one or more still-spinning simulated rotating reels are desirable. Similarly, systems and methods for adding one or more bonus trigger symbols to one or more still-spinning simulated rotating reels are desirable.

BRIEF DESCRIPTION

In one aspect, an electronic gaming machine configured to modify at least one symbol from at least one reel of a simulated rotating plurality of reels during play of a wagering game is provided. The electronic gaming machine includes a display configured to present the wagering game, a player input interface configured to receive a player input, a credit input mechanism including at least one of a card reader, a ticket reader, a bill validator, and a coin input mechanism, the credit input mechanism configured to receive a credit wager, and a game controller. The game controller is configured to perform operations comprising: (i) simulating, on the display, a rotating plurality of reels, each reel of the simulated rotating plurality of reels comprising a plurality of symbols including standard symbols and bonus trigger symbols; (ii) stopping, on the display, a first reel of the simulated rotating plurality of reels, wherein the stopped first reel displays a first plurality of symbols; (iii) determining whether the first plurality of symbols displayed include i) all standard symbols or ii) at least one bonus trigger symbol; (iv) on at least one remaining reel of the simulated rotating reels one of: i) modifying at least one bonus trigger symbol with a standard symbol if all standard symbols are displayed, or ii) modifying the at least one standard symbol with at least one bonus trigger symbol; (v) stopping, on the display, the remaining reels of the simulated rotating plurality of reels, wherein the stopped remaining reels display a plurality of symbols; (vi) evaluating the symbols stopped and displayed from each of the simulated rotating plurality of reels; and (vii) determining, based upon the evaluating, whether to provide a game award.

In another aspect, a method of modifying at least one symbol from at least one reel of a simulated rotating plurality of reels during play of a wagering game on an electronic gaming machine is provided. The method includes: (i) simulating, by a game controller and on a display, a rotating plurality of reels, each reel of the simulated rotating plurality of reels comprising a plurality of symbols including standard symbols and bonus trigger symbols; (ii) stopping, by the game controller and on the display, a first reel of the simulated rotating plurality of reels, wherein the stopped first reel displays a first plurality of symbols; (iii) determining, by the game controller, whether the first plurality of symbols displayed include i) all standard symbols, or ii) at least one bonus trigger symbol; (iv) on at least one remaining reel of the simulating rotating reels, one of: i) replacing at least one bonus trigger symbol with a standard symbol if all standard symbols are displayed, or ii) replacing at least one standard symbol with at least one bonus trigger symbol; (v) stopping, by the game controller and on the display, the remaining reels of the simulated rotating plurality of reels, wherein the stopped remaining reels display a plurality of symbols; (vi) evaluating, by the game controller, the symbols stopped and displayed from each of the simulated rotating plurality of reels; and (vii) determining, by the game controller and based upon the evaluating, whether to provide a game award.

In yet another aspect, an article of manufacture is provided. The article of manufacture includes a non-transitory, tangible, computer readable storage medium having instructions stored thereon that, in response to execution by a game controller configured to modify at least one symbol from at least one reel of a simulated rotating plurality of reels during play of a wagering game, cause the game controller to perform operations comprising: (i) simulating, by the game controller and on a display, a rotating plurality of reels, each reel of the simulated rotating plurality of reels comprising a plurality of symbols including standard symbols and bonus trigger symbols; (ii) stopping, by the game controller and on the display, a first reel of the simulated rotating plurality of reels, wherein the stopped first reel displays a first plurality of symbols; (iii) determining, by the game controller, whether the first plurality of symbols displayed include i) all standard symbols, or ii) at least one bonus trigger symbol; (iv) on at least one remaining reel of the simulated rotating reels, one of: i) replacing, by the game controller, at least one bonus trigger symbol with a standard symbol if all standard symbols are displayed, or ii) replacing at least one standard symbol with at least one bonus trigger symbol; (v) stopping, by the game controller and on the display, the remaining reels of the simulated rotating plurality of reels, wherein the stopped remaining reels display a plurality of symbols; (vi) evaluating, by the game controller, the symbols stopped and displayed from each of the simulated rotating plurality of reels; and (vii) determining, by the game controller and based upon the evaluating, whether to provide a game award.

BRIEF DESCRIPTION OF THE DRAWINGS

An example embodiment of the subject matter disclosed will now be described with reference to the accompanying drawings.

DETAILED DESCRIPTION

An electronic gaming machine configured to modify (e.g., remove) at least one bonus trigger symbol from at least one reel of a simulated rotating plurality of reels during play of a wagering game is described. In some embodiments, the electronic gaming machine stops a first reel of the simulated rotating plurality of reels and determines whether one or more bonus trigger symbols are displayed on the stopped first reel while the remaining reels are still spinning. If no bonus trigger symbol is displayed on the stopped first reel, one or more bonus trigger symbols may be removed from the remaining plurality of still-spinning reels and modified (e.g., replaced) by one or more standard symbols. On the other hand, if one or more bonus trigger symbols are displayed on the stopped first reel, one or more standard symbols of the remaining plurality of still-spinning reels may be modified (e.g., replaced) by one or more bonus trigger symbols. Thus, the electronic gaming machine described herein is configured to modify one or more still-spinning reels based upon the symbols displayed on a stopped reel of the simulated rotating plurality of reels.

As used herein, a "bonus award" may be provided to a player in response to a combination of bonus trigger symbols. For instance, in some embodiments, a bonus award may be a jackpot award provided to a player in response to a combination of jackpot symbols displayed from a plurality of reels. In at least one embodiment, a plurality of "scattered" jackpot symbols (e.g., jackpot symbols scattered over a plurality of reels) may correspond to a jackpot award.

Similarly, as used herein, a "line win" may correspond to any predefined combination of non-bonus trigger symbols, such as any predefined combination of one or more standard or non-bonus trigger symbols corresponding to an award in a paytable of a wagering game. In at least one embodiment, a line win may result from three or more collinearly displayed standard symbols. However, it will be appreciated that any suitable combination of standard symbols may result in a line win.

Figure 1:
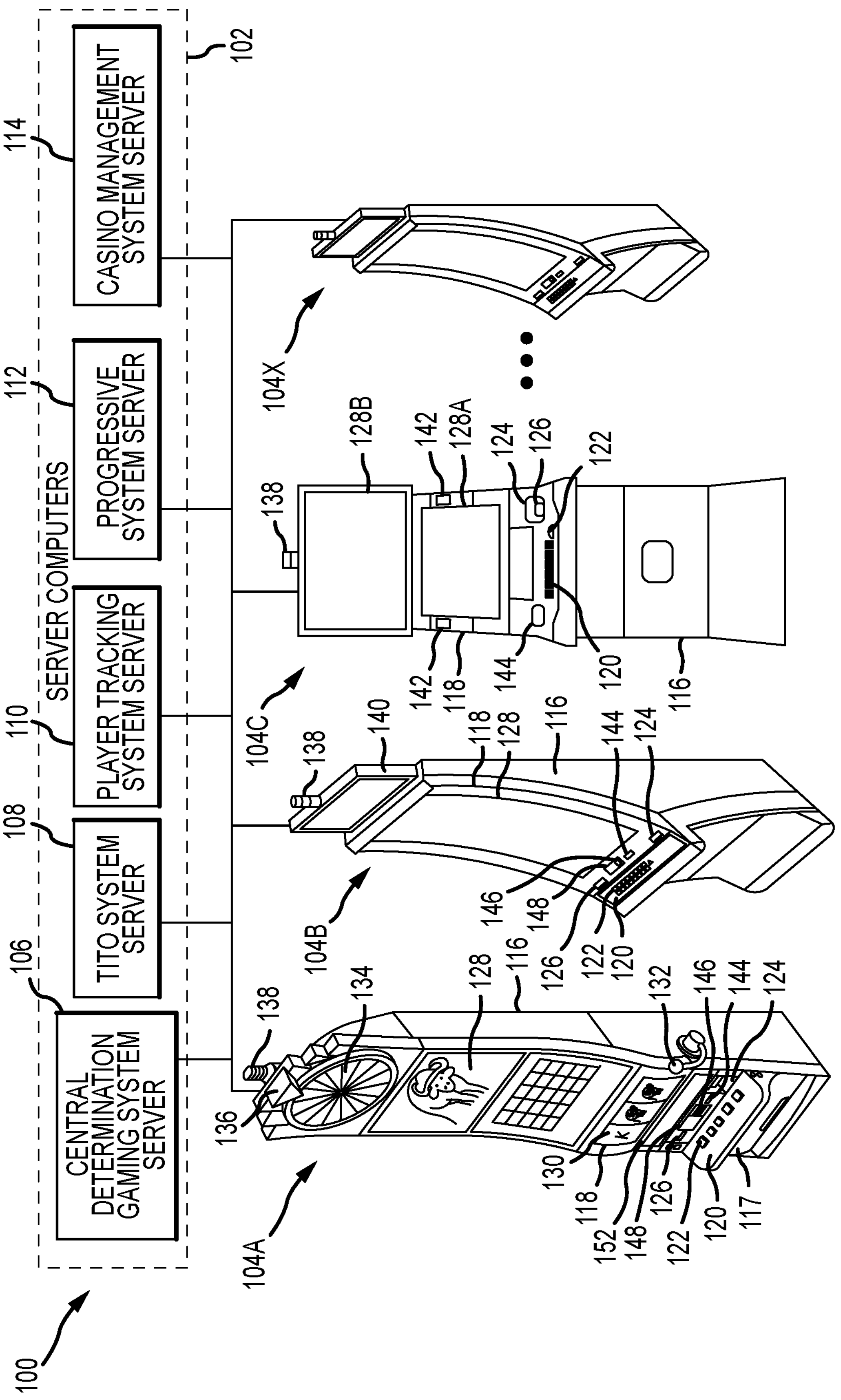
FIG. 1 is a diagram of exemplary EGMs networked with various gaming-related servers.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 117 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
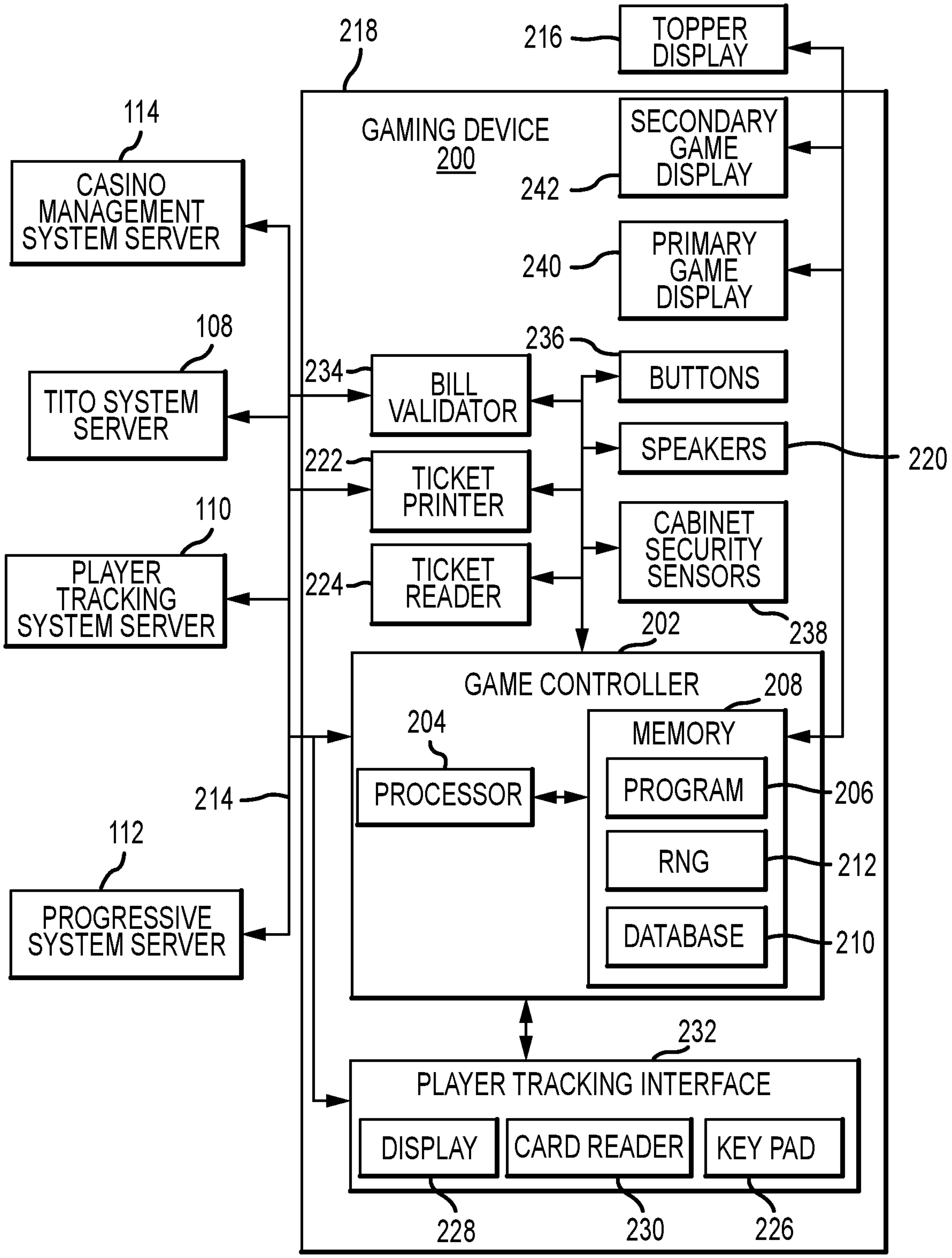
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 117 that opens to provide access to the interior of gaming device 104B. Main door 117, or service door, is typically used by service personnel to refill ticket-out printer 126 and collect bills and tickets inserted into bill validator 124. Main door 117 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A may include a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in one or more databases 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232*a*. Player tracking interface 232*a* may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232*a* to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
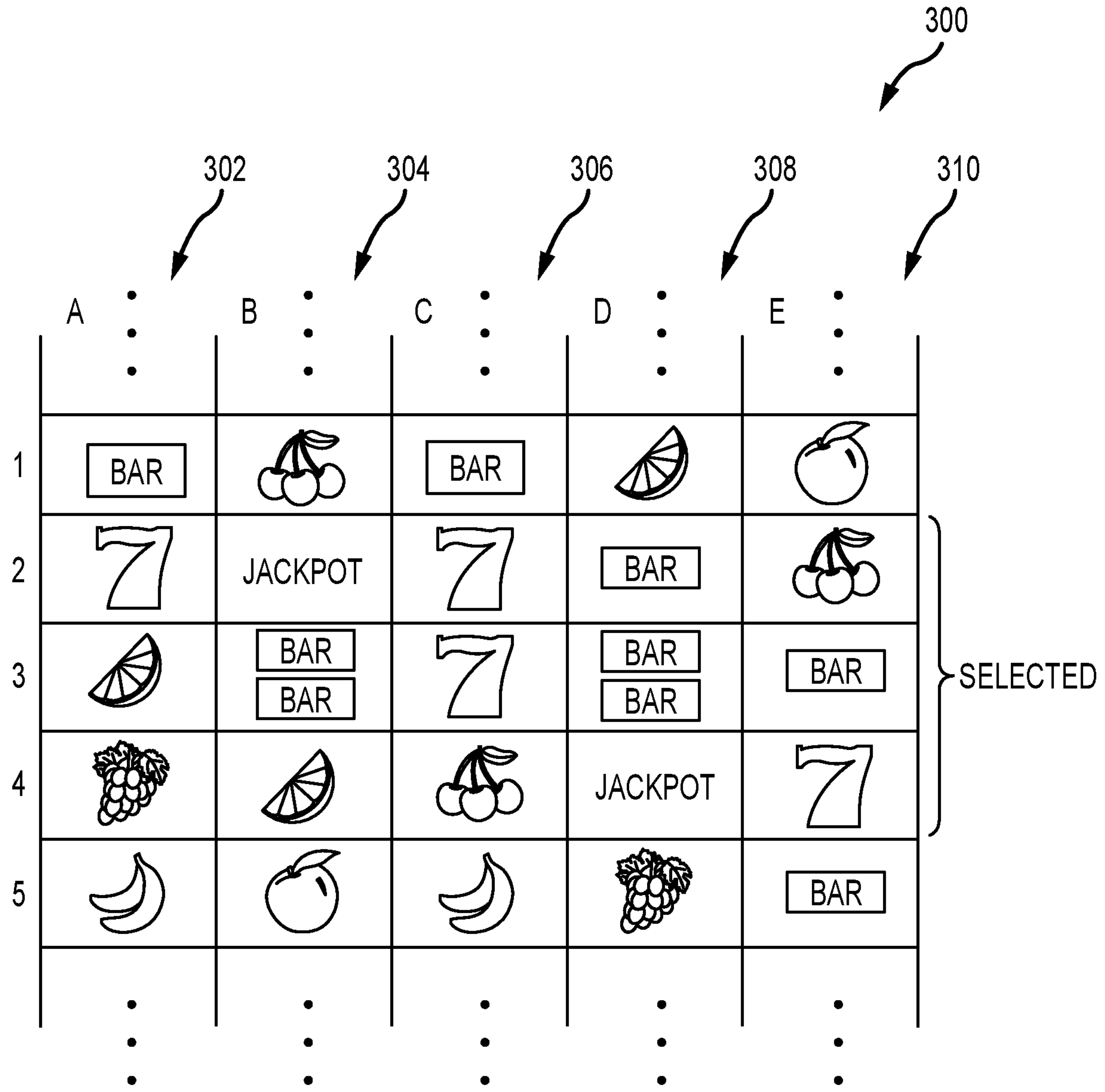
FIG. 3 is a schematic view of a plurality of reels, in which no bonus trigger symbol is stopped and displayed from a first reel of the plurality of reels.

FIG. 3 is a schematic view of a plurality of reels 300 for use with a wagering game presented or displayed by an EGM 104A-104X (as shown in FIG. 1 and FIG. 2). For example, reels 300 may include simulated or "virtual" reels generated and displayed by game controller 202 on primary game display 240 and/or secondary game display 242. In other embodiments, reels 300 may include one or more physical or mechanical reels having a display element, such as a liquid crystal display (LCD), capable of displaying one or more symbols during gameplay. In other embodiments, reels 300 may include a plurality of mechanical reels overlaid by an LCD panel.

In particular, FIG. 3 shows a first reel 302, a second reel 304, a third reel 306, a fourth reel 308, and a fifth reel 310. Each reel 302-310 includes a plurality of symbols, such as, for example, a plurality of symbols in the range of ten to several thousand symbols. In the exemplary embodiment, some of the symbols of each reel 302-310 are bonus trigger symbols, such as jackpot symbols, and some of the symbols of each reel 302-310 are non-bonus trigger symbols, such as "standard" symbols. As used herein, a "standard" symbol may refer to any symbol that is not a bonus trigger symbol. Similarly, as used herein, a "bonus trigger" symbol may refer to any symbol capable of triggering a bonus, such as a jackpot, alone or in combination with one or more other bonus trigger symbols. As used herein, a "wild" symbol may refer to any symbol capable of substituting, e.g. on a line win, for another symbol, including some or all standard symbols and bonus trigger symbols. As described herein, predefined combinations of bonus trigger symbols may result in one or more bonus awards, such as one or more jackpot awards. Likewise, predefined combinations of standard symbols may result in one or more non-bonus or standard awards, such as one or more line wins.

Each reel 302-310 may include a plurality of symbol positions, which may, together, define a matrix of symbol positions. Each symbol position may be designated by a row number (e.g., "1," "2," "3," "4," "5," etc.) and a column letter (e.g., "A," "B," "C," "D," "E," etc.) For example, the upper-left-most symbol position, occurring on reel 302 at the intersection of row 1 and column A, may be designated by the symbol position "1A."

During gameplay, each reel 302-310 may be spun and stopped to display a subset of the symbols of each reel 302-310. For example, in at least some embodiments, three symbol display positions of each reel 302-310 may be selected, stopped, and displayed by game controller 202 for presentation to a player. In at least some embodiments, one or more consecutive symbols are selected from each reel 302-310 for presentation. For example, if a symbol at symbol position "1A" is selected by game controller 202 for presentation, the symbols at symbol positions "2A" and "3A" may also be selected and displayed.

Thus, a plurality of symbols from each of reels 302-310 may be stopped and displayed for presentation to a player of the wagering game. As described above, these symbols may include either or both of one or more bonus trigger symbols and/or one or more standard symbols. In some cases, a bonus trigger symbol may be displayed or interposed between two standard symbols which might, if the bonus trigger symbol were not interposed, result in a standard line win, such as, for example, three collinearly displayed standard symbols of the same type. For example, as shown with reference to FIG. 3, a first "lucky seven" symbol may displayed at symbol position "2A" and a second "lucky seven" symbol may displayed at symbol position "2C." At symbol position "2B," however, a bonus trigger symbol (e.g., a "jackpot" symbol) may be interposed between the first "lucky seven" symbol at symbol position "2A" and the second "lucky seven" symbol at symbol position "2C."

A paytable of the wagering game may specify that three "lucky seven" symbols displayed in a row (e.g., in this case, along row "2") corresponds to a standard game award, such as, for example, a standard line win. However, because the "jackpot" symbol is interposed between the first "lucky seven" symbol at symbol position "2A" and the second "lucky seven" symbol at symbol position "2C," no game award may be provided to the player. The interposed "jackpot symbol" may be regarded as a "blocking" symbol, in that the "jackpot" symbol at symbol position "2B" is "blocking" placement of a standard symbol (possibly corresponding to an additional "lucky seven" symbol) at symbol position "2B."

Although the example above is described with reference to "lucky seven" symbols, it will be appreciated that numerous winning symbol combinations may be defined by a paytable of a wagering game. It will also be appreciated that winning symbol combinations may be other than a combination of three collinearly displayed symbols of a same type (e.g., three collinearly displayed "lucky seven" symbols). Rather, it will be appreciated that winning symbol combinations need not, in all cases, be collinear. It will also be appreciated that greater or fewer than three symbols of a same type may trigger a game award. As a result, "blocking" symbols may occur in a variety of locations and under a variety of circumstances. Broadly, and as used herein, a "blocking" symbol may be any bonus trigger symbol that does not contribute to a bonus award, such as a jackpot award. Similarly, in some cases, a standard symbol may function as a "blocking" symbol, such as, for example, where the standard symbol interrupts a sequence of bonus trigger symbols.

In addition to the definitions provided above, in at least some embodiments, a "determining symbol" may refer to any symbol, such as any bonus trigger symbol and/or any standard symbol, that occurs on a reel 302-310 and that causes, or results in, a symbol modification on at least one other reel 302-310. Specifically, in at least some embodiments, a "determining symbol" may cause, or result in, a symbol modification of one or more "undetermined symbols" occurring on one or more other reels 302-310. As used herein, an "undetermined symbol" may include any symbol that is capable of being modified in response to the occurrence of a determining symbol. For example, in at least some embodiments, a determining symbol may include a symbol that occurs on a stopped reel 302-310, such as for example, a stopped first reel 302, and an undetermined symbol may be a symbol that is capable of modification (e.g., addition, removal, or replacement) on any still-spinning reel 302-310.

To illustrate, a bonus trigger symbol may occur on a stopped first reel, such as reel 302. In some cases, the bonus trigger symbol on reel 302 may be regarded as a determining symbol, in that the bonus trigger symbol on reel 302 may effect a symbol modification on a still-spinning reel 304-310 of any undetermined symbol on any still-spinning reel 304-310, such as, for example, to cause a replacement of a standard symbol on any still-spinning reel 304-310 with a bonus trigger symbol. The bonus trigger symbol on reel 302 may also, as described herein, be regarded as a "blocking" symbol, in that it may block or interrupt a series of standard symbols on reels 304-310.

Figure 4:
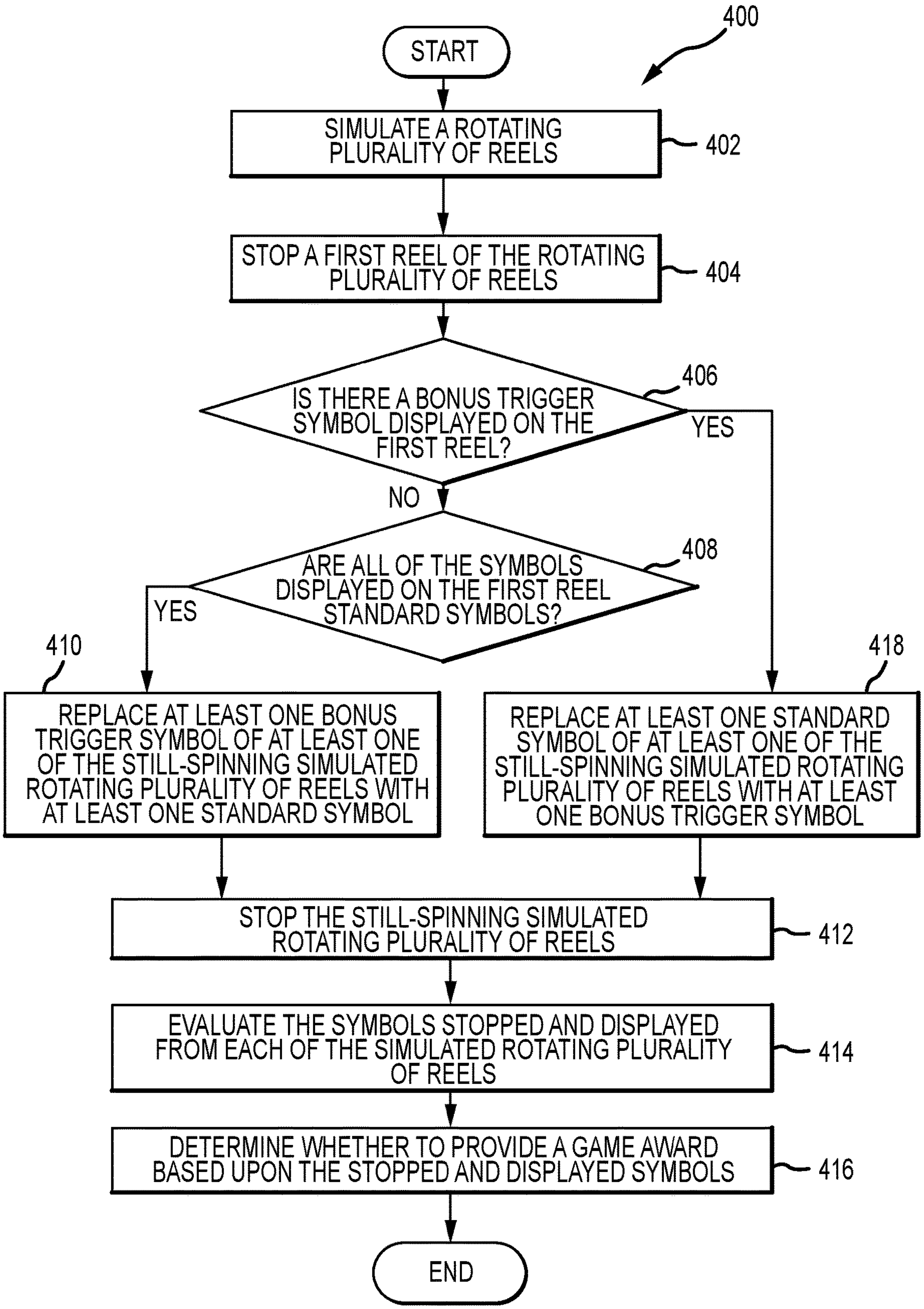
FIG. 4 is a flowchart illustrating a process for modifying one or more symbols on a simulated rotating plurality of reels during a wagering game played on an EGM, as shown in FIG. 1 and FIG. 2.

FIG. 4 is a flowchart illustrating a process 400 for modifying one or more symbols, such as one or more "undetermined symbols," as described herein, on a simulated rotating plurality of reels during a wagering game played on an EGM 104A-104X (as shown in FIG. 1 and FIG. 2). As used herein, symbol "modification" may include one or more symbol replacements, one or more symbol removals, and/or one or more symbol additions. In the example shown at FIG. 4, process 400 illustrates symbol modification by way of removal and replacement of one or more undetermined symbols, some of which may include "blocking" symbols, as described above, occurring on one or more of reels 302-310. Process 400 also illustrates an embodiment in which one or more undetermined symbols, such as one or more bonus trigger symbols, are added to one or more of reels 302-310, such as, for example, in response to a determination that one or more bonus trigger symbols (e.g., determining symbols) are displayed on a stopped reel 302-310 of plurality of reels 300.

In addition to the symbol modification techniques described below, in at least some embodiments, symbol modifications may be based upon one or more modified undetermined symbol probabilities. More particularly, in various embodiments, and as used herein, an "undetermined symbol probability" may refer to a probability that an undetermined symbol (e.g. a bonus trigger symbol and/or a standard symbol) will occur on a reel 302-310. Likewise, as used herein, a "modified undetermined symbol probability" may refer to a modified or updated probability that an undetermined symbol (e.g., a bonus trigger symbol and/or a standard symbol) will occur on a reel 302-310. In the exemplary embodiment, and as described below, an undetermined symbol probability may be modified based upon the occurrence of one or more determining symbols on one or more reels 302-310.

In an exemplary embodiment, a reel may only include two symbols (e.g., symbol A and symbol B) and may only display one of the two symbols (A or B) at any given time. An undetermined symbol probability for symbol A may be 0.9, and an undetermined symbol probability for symbol B may be 0.1, (i.e., symbol A may be displayed on a stopped reel 90% of the time, and symbol B may be displayed on a stopped reel 10% of the time). If symbol B is a bonus trigger symbol and it is desirable to prevent the occurrence of symbol B as a blocking symbol on the reel, the undetermined symbol probability for symbol A may be modified to 1.0, (i.e. displayed 100% of the time) and the undetermined symbol probability for symbol B may be modified to 0.0, (i.e. displayed 0% of the time). Using these modified undetermined symbol probabilities, symbol A will always occur, and symbol B will never occur (e.g., until the undetermined symbol probabilities are once again modified).

Accordingly, in the exemplary embodiment, game controller 202 may simulate rotation of reels 302-310, such as, for example, on either or both of primary game display 240 and/or secondary game display 242 (step 402). For example, each reel 302-310 may be independently spun. In various embodiments, reels 302-310 may be spun in response to a wager, such as a credit wager, provided by the player, such as via bill validator 234 and/or ticket reader 224. In other words, a player may place or specify a wager, and reels 302-310 may be spun in response.

While each of reels 302-310 are spinning, game controller 202 may stop one or more of reels 302-310, at which point, a plurality of symbols (e.g., a plurality of symbols which may include one or more determining symbols) may be stopped and displayed from the one or more stopped reels 302-310 (step 404). For example, in at least one embodiment, a "first reel" of reels 302-310 may be stopped, and a plurality of symbols may be displayed from the first reel, while the remaining reels 204-310 continue to spin. As used herein, however, the "first reel" need not correspond to a left-most reel (e.g., reel 302). Rather, any of reels 302-310 may be stopped while one or more other reels 302-310 continue to spin. Accordingly, as used herein, a "first reel" or "first stopped reel" may refer to a first stopped reel, or a reel that is stopped first while one or more other reels 302-310 continue to spin.

Once a first reel is stopped, game controller 202 may, in addition, determine whether a bonus trigger symbol, such as a jackpot symbol, is displayed from the first stopped reel (step 406). For example, as shown with reference to FIG. 4, game controller 202 may stop reel 302 first, leaving reels 304-310 still spinning. The symbols stopped and displayed from reel 302 may be evaluated by game controller 202 to determine whether a bonus trigger symbol is stopped and displayed. In the example of FIG. 4, no bonus trigger symbol is displayed from reel 302.

If none of the symbols displayed from a stopped reel (e.g., reel 302) are bonus trigger symbols, game controller 202 may determine whether (or verify that) all of the symbols displayed from the stopped reel are standard symbols (step 408). In other embodiments, a determination by game controller 202 that none of the symbols displayed from a stopped reel are bonus trigger symbols may be sufficient, and no additional determination or verification step may be required (e.g., step 408 may be omitted in some embodiments).

In either case, however, game controller 202 may modify (e.g., replace) one or more bonus trigger symbols of at least one or more still-spinning reels with one or more standard symbols in response to a determination that all of the symbols displayed from the stopped reel are standard symbols (step 410). For example, game controller 202 may replace one or more bonus trigger symbols of one or more of reels 304-310 in response to a determination that all standard symbols are displayed from first stopped reel 302. Thus, the symbols stopped and displayed from reel 302 (whether they are standard symbols or bonus trigger symbols) may function as determining symbols, in that they may effect or cause a symbol modification of one or more still-spinning reels 304-310. Alternatively, upon a determination that there are no bonus trigger symbols displayed on a stopped reel (e.g., reel 302), an undetermined symbol probability of one or bonus trigger symbols of at least one or more still-spinning reels may be modified to reduce or remove the likelihood that the one or more bonus symbols will be displayed on at least one or more of the still spinning reels.

In some embodiments, game controller 202 may sequentially stop one or more of reels 302-310. For example, game controller 202 may stop a first reel, such as reel 302, as described herein. Subsequently, game controller may stop a second reel, such as reel 304. In response to stopping a second reel, such as reel 304, game controller may modify (e.g., replace) one or more bonus trigger symbols of at least one or more still-spinning reels (e.g., reels 306-310) with one or more standard symbols in response to a determination that all of the symbols displayed from stopped reel 304 are standard symbols (thus, symbols from reel 304 may also function as determining symbols for undetermined symbols on reels 306-310). This pattern may continue, from left to right, right to left, and/or in any other order, until each of the reels 302-310 are stopped. Reels 302-310 may also be sequentially stopped, as described herein, when one or more bonus trigger symbols are added to reels 302-310 (e.g., when standard symbols are replaced). Alternatively, reels 302-310 may also be sequentially stopped, as described herein, wherein in response to a determining symbol displayed on a stopped reel the undetermined symbol probability of an undetermined symbol on one or more still-spinning reels may be modified to increase or reduce the likelihood of the display of the undetermined symbol on the one or more still-spinning reels.

Figure 5:
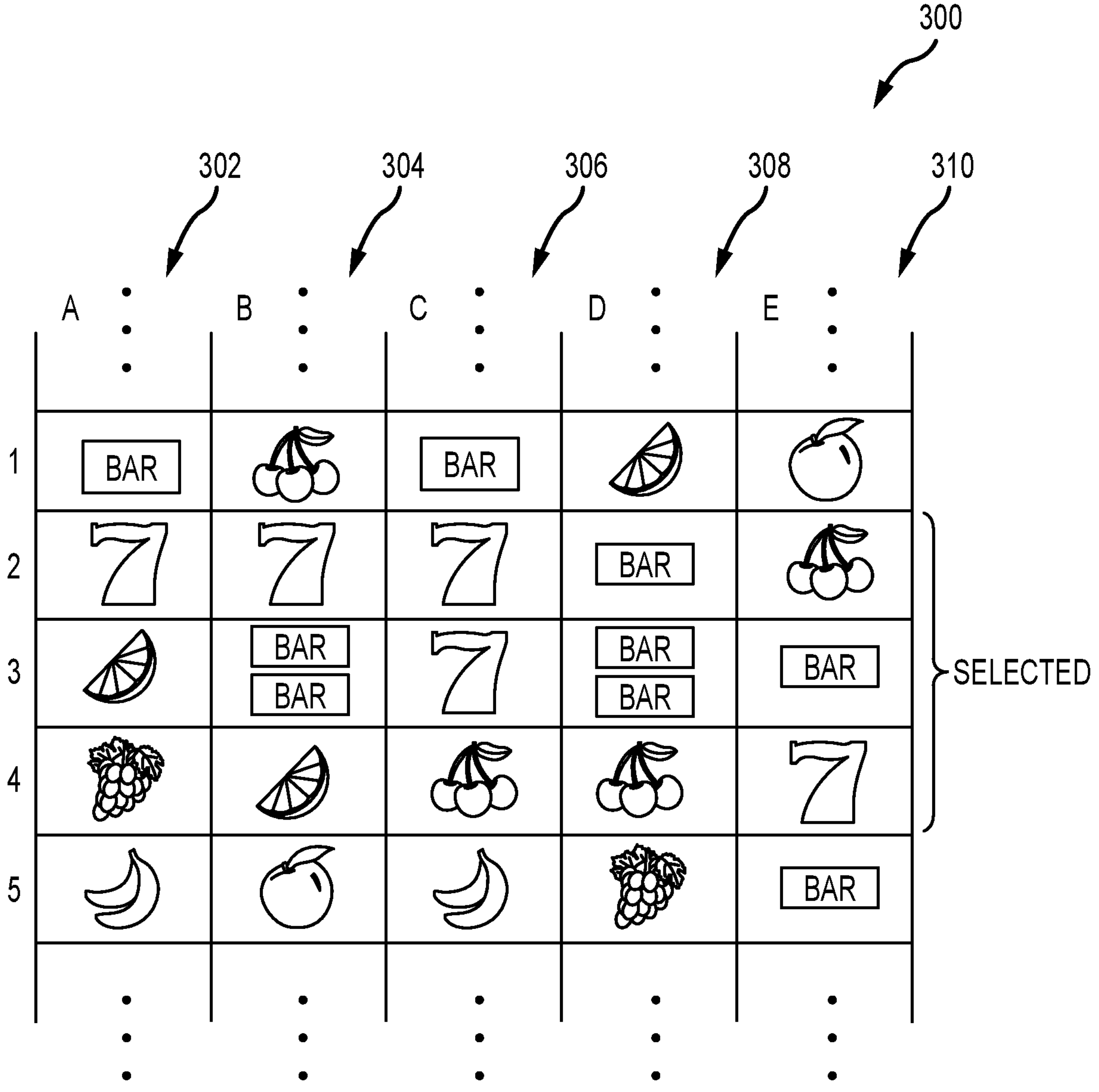
FIG. 5 is a schematic view of the plurality of reels shown in FIG. 4, in which bonus trigger symbols are removed from one or more of the plurality of reels.

FIG. 5 is a schematic view of reels 302-310 (shown in FIG. 3), in which one or more of reels 300-310 are modified by removing one or more bonus trigger symbols from one or more of reels 304-310 in response to a determination that at least one bonus trigger symbol is not displayed from first stopped reel 302. Specifically, and as shown, game processor 202 may evaluate reel 302 to determine that no bonus trigger symbols are displayed from the first stopped reel 302. In response, game controller may remove a first bonus trigger symbol 502 at symbol position "2B" and/or a second bonus trigger symbol 504 at symbol position "4D."

Specifically, the bonus trigger symbols at symbol positions "2B" and "4D" may be modified (e.g., removed and replaced) by one or more standard symbols. In various embodiments, the standard symbols used to replace one or more bonus trigger symbols may be randomly selected by game controller 202 and/or selected by game controller 202, based upon a paytable and/or one or more symbol probabilities, as described above.

In the example shown, the bonus trigger symbol at symbol position "2B" may be modified (e.g., replaced) by a "lucky seven" symbol, and the bonus trigger symbol at symbol position "4D" may be modified (e.g., replaced) by a "cherry" symbol. It will be appreciated, however, that any standard symbol may be substituted at symbol positions "2B" and "4D." In some embodiments reel symbols from above/below the bonus trigger symbol may cascade down/up to modify (e.g., replace) the bonus trigger symbol, until all bonus trigger symbols are modified (e.g., removed). For example, an animation (such as a "popping" or "exploding" animation) may be used that depicts removal of a bonus trigger symbol. As described herein, a similar animation may be applied when standard symbols are removed. Further, as described herein, symbol modifications may be applied to one or more still-spinning reels 302-310, such that a player experiences one or more "popping" and/or other symbol animations while one or more of reels 302-310 are still spinning.

Once the symbol modifications (e.g., replacements) are performed, game controller 202 may stop the remaining still-spinning reels (step 412). In this example, game controller 202 may stop reels 304-310 after performing the symbol replacements at symbol positions "2B" and "4D." Once all of reels 302-310 are stopped and one or more symbols are displayed from each (including the symbol substitutions at symbol positions "2B" and "4D"), game controller may evaluate the symbols displayed from each of stopped reels 302-310 (step 414) and determine, based upon the displayed combination of symbols, whether a game award is to be provided to the player of the wagering game (step 416). Specifically, game controller may evaluate the stopped and displayed symbols to determine whether the player is entitled to a line win and/or a bonus award.

In this example, three "lucky seven" symbols are displayed in a collinear pattern at symbol display positions "2A," "2B," and "2C." Game controller 202 may evaluate and/or analyze the collinearly displayed "lucky seven" symbols at each of these symbol positions to determine, based upon a paytable of the wagering game, that the player is entitled to an award. Specifically, the player may be entitled to an award corresponding to three collinearly displayed "lucky seven" symbols.

Thus, game controller 202 may modify (e.g., remove and replace) a bonus trigger symbol that may otherwise function as a "blocking" symbol, as described above, from one or more still-spinning reels to increase a player's chances of achieving a standard symbol combination that may, in the absence of the "blocking" symbol, correspond to a line win in a paytable of the wagering game.

The example described above is merely illustrative, however. It will be appreciated that, in some cases, although a number of bonus trigger symbols are modified (e.g., replaced) by one or more standard symbols, a player may not be entitled to a line win. For instance, in the example shown at FIG. 4 and FIG. 5, game controller 202 may replace the bonus trigger symbol at symbol position "2B" with a standard symbol, such as a "cherry" symbol (or another standard symbol that is not a "lucky seven" symbol), in which case, the player may not be eligible for a line win at symbol positions "2A," "2B," and "2C."

One result of modifying (e.g., replacing) one or more bonus trigger symbols of reels 302-310 with one or more standard, or non-bonus, symbols is that a probability of achieving one or more winning combinations of standard symbols may increase in response to modification (e.g., removal) of one or more bonus trigger symbols. Specifically, removal of one or more "blocking" (or potentially blocking) bonus trigger symbols may facilitate an increase, as a result of the symbol replacement, in the probability that a predefined winning combination of standard symbols will occur. Likewise, removal of the one or more bonus trigger symbols may correspond to a decrease in the probability that a bonus award (e.g. a jackpot award) will occur. In other words, removal of one or more bonus symbols from reels 302-310 may correspond to a reduction in the probability of a bonus or jackpot award and an increase in the probability of a line win.

In various embodiments, symbol modification (e.g., replacement) operations may be persistent for some period of time. That is, once a bonus trigger symbol is replaced by a standard symbol, as described above, the alteration to the reel 302-310 on which the symbol occurs may persist for some period of time. In some embodiments, the period of time may correspond to a duration of a particular gaming session (e.g., the symbol replacement may be sustained until the player cashes out of the wagering game or otherwise terminates the wagering game). In other embodiments, symbol replacements may persist until a player achieves a line win and/or a bonus award. In yet another embodiment, symbol replacements may not persist beyond a single spin of reels 302-310. In such a case, reels 302-310 may be reset to an initial condition after each spin. For instance, reels 302-310 may be returned to the configuration shown at FIG. 4 after each spin of reels 302-310.

Returning now to FIG. 4, in response to a determination that at least one bonus trigger symbol is displayed from a stopped reel, game controller 202 may modify (e.g., replace) one or more non-bonus trigger symbols (e.g., one or more standard symbols) of one or more of the still-spinning reels with one or more bonus trigger symbols (step 418). As described above, symbol modifications may be based upon one or more modified undetermined symbol probabilities and may appear while one or more reels 302-310 are still-spinning. In other words, in some embodiments, bonus trigger symbols may be added to one or more reels 302-310 rather than, as described above, removed from one or more of the reels 302-310. As a result, one or more standard symbols may be removed from one or more of reels 302-310 to accommodate placement of one or more bonus trigger symbols.

Figure 6:
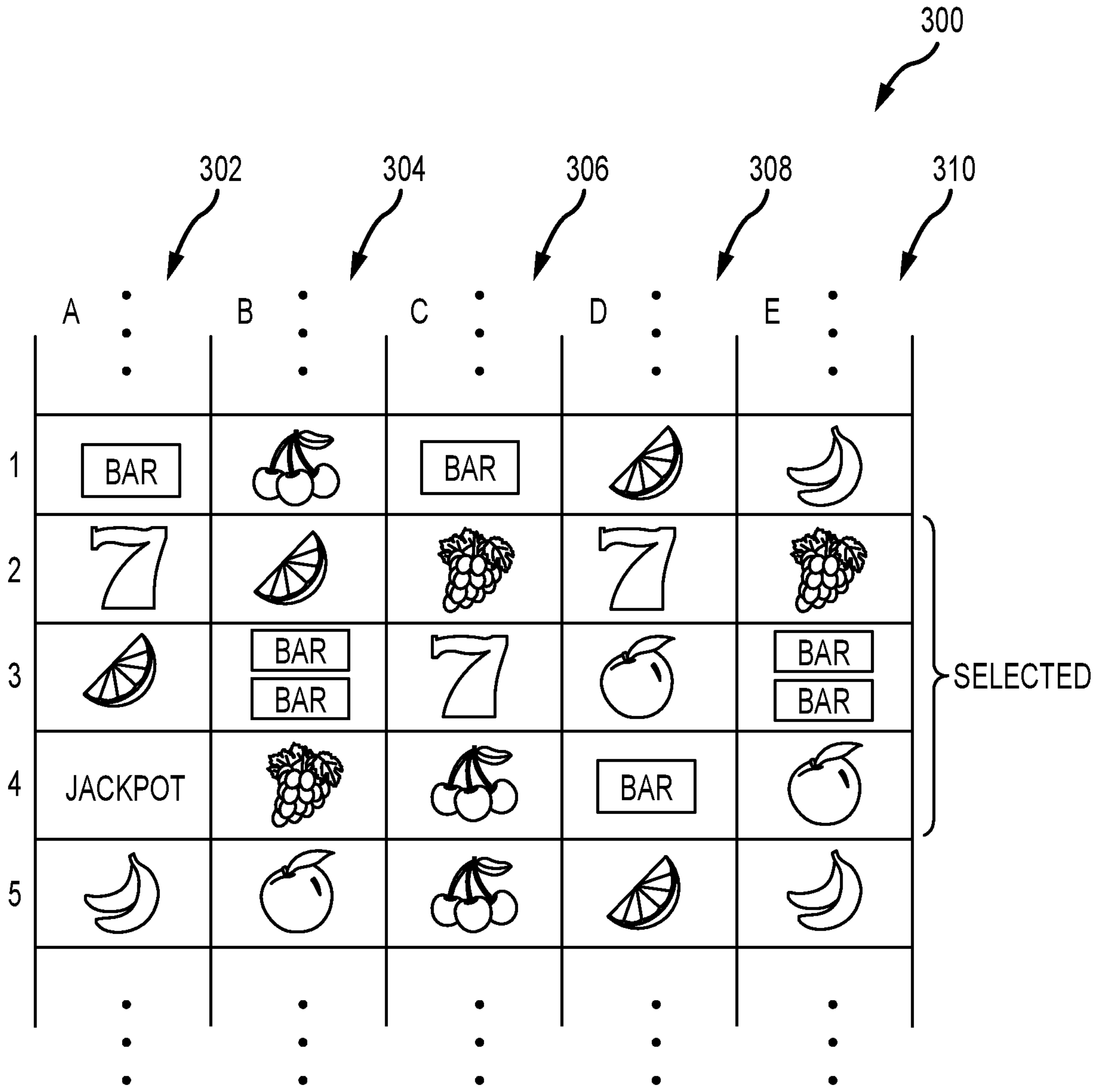
FIG. 6 is a schematic view of a plurality of reels, in which a bonus trigger symbol is stopped and displayed from a first reel of the plurality of reels.

FIG. 6 is a schematic view of reels 302-310, in which a bonus trigger symbol is stopped and displayed from a first reel (e.g., reel 302) of the plurality of reels 302-310. As described above, a "first reel" need not correspond to a left-most reel (e.g., reel 302). Rather, a first reel may correspond to a first-stopped reel, which may, as described above, be any of reels 302-310.

In the example shown at FIG. 6, game controller 202 may modify (e.g., replace) any standard symbol of any of still-spinning reels 304-310 in response to a determination that one or more bonus trigger symbols are displayed from stopped reel 302. In some embodiments, the selection of one or more standard symbols for replacement may be randomly determined. However, in other embodiments, certain standard symbols may be pre-designated, such as by way of an identifier, for replacement in response to the occurrence of a bonus trigger symbol on a stopped reel. In some cases, such an identifier may simply indicate that a standard symbol should be replaced, or is eligible for replacement, in response to the occurrence of a bonus trigger symbol on another reel.

Figure 7:
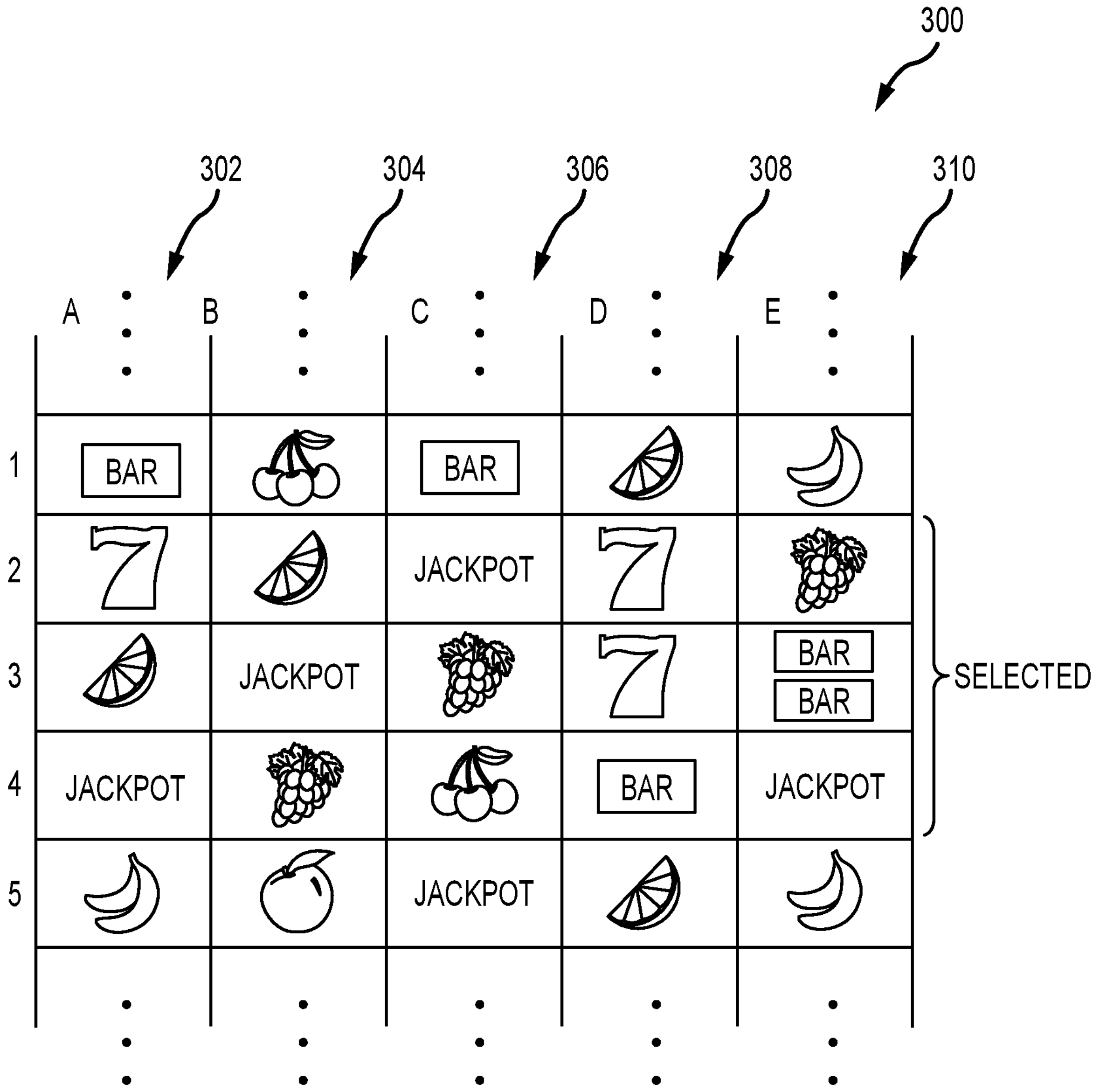
FIG. 7 is a schematic view of the plurality of reels shown in FIG. 6, in which bonus trigger symbols are added to one or more of the plurality of reels.

FIG. 7 is a schematic view of reels 302-310 shown in FIG. 6, in which bonus trigger symbols are added to one or more of reels 302-310. Specifically, and as shown, a first bonus trigger symbol may be added to reel 304 at symbol position "3B," a second bonus trigger symbol may be added to reel 306 at symbol position "2C," a third bonus trigger symbol may be added to reel 306 at symbol position "5C," and a fourth symbol may be added to reel 310 at symbol position "4E." It will be appreciated, however, that these symbol substitutions are merely illustrative. Any standard symbol of any of reels 302-310 may be replaced by a bonus trigger symbol. As described herein, the determination as to which standard symbols should be replaced by bonus trigger symbols may be random and/or based, all or in part, upon an identifier specifying that a bonus trigger symbol is eligible for replacement.

Once the symbol modifications are performed, game controller 202 may stop the remaining still-spinning reels (step 412). For instance, game controller 202 may stop reels 304-310 after performing the symbol replacements at symbol positions "3B," "2C," "5C," and "4E." Once all of reels 302-310 are stopped and one or more symbols are displayed from each (including the symbol substitutions at symbol positions"3B," "2C," "5C," and "4E"), game controller 202 may evaluate the symbols displayed from each of stopped reels 302-310 (step 414) and determine, based upon the displayed combination of symbols, whether a game award is to be provided to the player of the wagering game (step 416). Specifically, game controller 202 may evaluate the stopped and displayed symbols to determine whether the player is entitled to a line win and/or a bonus award.

In this example, five bonus trigger symbols (e.g., jackpot symbols) are scattered over reels 302-310 once each reel 302-310 is stopped. Game controller 202 may thus evaluate the scattered bonus trigger symbols to determine whether a bonus award, such as a jackpot award, should be provided to the player. In some embodiments, any number of scattered bonus trigger symbols greater than or equal to three bonus trigger symbols may result in a jackpot award. That is, three or more scattered bonus trigger symbols may correspond to a bonus award. In addition, greater numbers of scattered bonus trigger symbols may correspond to larger bonus awards.

One result of replacing one or more standard symbols of reels 302-310 with one or more bonus trigger symbols is that a probability of achieving one or more winning combinations of standard symbols may decrease in response to removal of one or more standard symbols. Specifically, removal of one or more standard symbols may correspond to a decrease, as a result of the symbol replacement, in the probability that a predefined winning combination of standard symbols will occur. Likewise, addition of the one or more bonus trigger symbols may correspond to an increase in the probability that a bonus award (e.g. a jackpot award) will occur. In other words, removal of one or more standard symbols from reels 302-310 may correspond to a reduction in the probability of a standard symbol line win and an increase in the probability of a bonus award.

An electronic gaming machine configured to modify (e.g., remove) at least one bonus trigger symbol from at least one reel of a simulated rotating plurality of reels during play of a wagering game is therefore described. In some embodiments, the electronic gaming machine stops a first reel of the simulated rotating plurality of reels and determines whether one or more bonus trigger symbols are displayed on the stopped first reel. If no bonus trigger symbol is stopped and displayed on the first reel, one or more bonus trigger symbols may be removed from the remaining plurality of still-spinning reels and replaced by one or more standard symbols. On the other hand, if one or more bonus trigger symbols are displayed, one or more standard symbols of the remaining plurality of still-spinning reels may be replaced by one or more bonus trigger symbols. Thus, the electronic gaming machine described herein is configured to modify one or more still-spinning reels based upon the symbols displayed on a stopped reel of the simulated rotating plurality of reels.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

at least one memory with instructions stored thereon; and at least one processor in communication with the at least one memory, wherein the instructions, when executed by the at least one processor, cause the at least one processor to:

cause display of a plurality of reels spinning, wherein each reel of the plurality of reels comprises a respective plurality of symbols;

determine that a first reel of the plurality of reels has stopped spinning and does not include a trigger symbol displayed thereon; and based on the first reel being stopped and not including the trigger symbol displayed thereon, cause the trigger symbol to be replaced with a non-trigger symbol on at least one reel of the plurality of reels still spinning.

2. The electronic gaming device of claim 1, wherein the instructions further cause the at least one processor to:

cause the at least one reel still spinning to stop spinning; and provide an output corresponding to symbols displayed on the plurality of reels.

3. The electronic gaming device of claim 1, wherein the instructions further cause the at least one processor to cause display of an animation to communicate that the trigger symbol is being replaced.

4. The electronic gaming device of claim 3, wherein the animation comprises at least one of a popping animation or an exploding animation.

5. The electronic gaming device of claim 1, wherein the trigger symbol is replaced in a first play of an electronic game, and wherein for a second play of the electronic game the instructions further cause the at least one processor to:

cause display of the plurality of reels spinning;

determine that the first reel of the plurality of reels has stopped spinning during the second play and includes the trigger symbol displayed thereon; and based on the first reel being stopped and including the trigger symbol displayed thereon, cause the non-trigger symbol to be replaced with the trigger symbol on at least one reel of the plurality of reels still spinning during the second play.

6. The electronic gaming device of claim 5, wherein the instructions further cause the at least one processor to cause display of an animation to communicate that the non-trigger symbol is being replaced.

7. The electronic gaming device of claim 6, wherein the animation comprises at least one of a popping animation or an exploding animation.

8. The electronic gaming device of claim 1, wherein the instructions further cause the at least one processor to cause the trigger symbol to be replaced based at least in part on at least one message received from a server.

9. At least one non-transitory computer-readable storage medium with instructions stored thereon that, in response to execution by at least one processor, cause the at least one processor to:

cause a plurality of reels spinning to be displayed, wherein each reel of the plurality of reels comprises a respective plurality of symbols;

determine that a first reel of the plurality of reels has stopped spinning and does not include a trigger symbol displayed thereon; and based at least in part on the first reel being stopped and not including the trigger symbol displayed thereon, cause the trigger symbol to be replaced with a non-trigger symbol on at least one reel of the plurality of reels still spinning.

10. The at least one non-transitory computer-readable storage medium of claim 9, wherein the instructions further cause the at least one processor to cause the trigger symbol to be replaced with the non-trigger symbol by transmitting at least one message to a gaming device displaying the plurality of reels.

11. The at least one non-transitory computer-readable storage medium of claim 10, wherein receipt of the at least one message causes the gaming device to display an animation indicating that the trigger symbol is being replaced.

12. The at least one non-transitory computer-readable storage medium of claim 11, wherein the animation comprises at least one of a popping animation or an exploding animation.

13. The at least one non-transitory computer-readable storage medium of claim 10, wherein the trigger symbol is replaced with the non-trigger symbol for a play of an electronic game, and wherein the instructions further cause the at least one processor to:

determine an outcome for the play of the electronic game; and transmit at least one message associated with the outcome to the gaming device displaying the electronic game.

14. The at least one non-transitory computer-readable storage medium of claim 10, wherein the gaming device comprises at least one of an electronic gaming machine (EGM), a smart phone, a tablet, a laptop, or a game console.

15. A method of electronic gaming implemented by at least one processor in communication with at least one memory, the method comprising:

causing a plurality of reels to be displayed as spinning for a play of an electronic game, wherein each reel of the plurality of reels comprises a respective plurality of symbols;

identifying that a first reel of the plurality of reels has stopped spinning and does not include a trigger symbol displayed thereon; and in response to the first reel being stopped and not including the trigger symbol displayed thereon, causing the trigger symbol to be replaced with a non-trigger symbol on at least one reel of the plurality of reels still spinning.

16. The method of claim 15, further comprising:

causing the at least one reel still spinning to stop spinning; and providing an output corresponding to symbols displayed on the plurality of reels.

17. The method of claim 15, further comprising causing an animation to be displayed, wherein the animation indicates that the trigger symbol is being replaced.

18. The method of claim 17, wherein the animation comprises at least one of a popping animation or an exploding animation.

19. The method of claim 15, wherein the trigger symbol is replaced in a first play of the electronic game, and wherein for a second play of the electronic game the method further comprises:

causing the plurality of reels to be displayed as spinning;

identifying that the first reel of the plurality of reels has stopped spinning during the second play and includes the trigger symbol displayed thereon; and in response to the first reel being stopped and including the trigger symbol displayed thereon, causing the non-trigger symbol to be replaced with the trigger symbol on at least one reel of the plurality of reels still spinning during the second play.

20. The method of claim 15, further comprising causing the trigger symbol to be replaced based at least in part on at least one message received from a server.

* * * * *